(12) United States Patent
Kishimoto et al.

(10) Patent No.: US 11,297,752 B2
(45) Date of Patent: Apr. 12, 2022

(54) MULCHING MACHINE

(71) Applicant: YANMAR CO., LTD., Osaka (JP)

(72) Inventors: Takeshi Kishimoto, Osaka (JP);
Kazuyuki Kotani, Osaka (JP);
Toshikazu Kokubunji, Osaka (JP);
Tadayoshi Sukigara, Okazaki (JP);
Kazuyoshi Tutiya, Okazaki (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 254 days.

(21) Appl. No.: 16/478,039

(22) PCT Filed: Jan. 15, 2018

(86) PCT No.: PCT/JP2018/000766
§ 371 (c)(1),
(2) Date: Jul. 15, 2019

(87) PCT Pub. No.: WO2018/131701
PCT Pub. Date: Jul. 19, 2018

(65) Prior Publication Data
US 2019/0364716 A1 Dec. 5, 2019

(30) Foreign Application Priority Data
Jan. 16, 2017 (JP) .............................. JP2017-005369

(51) Int. Cl.
A01B 49/02 (2006.01)
A01B 49/04 (2006.01)
(Continued)

(52) U.S. Cl.
CPC .............. *A01B 49/02* (2013.01); *A01B 13/02* (2013.01); *A01B 33/16* (2013.01); *A01B 49/04* (2013.01); *A01G 13/0287* (2013.01)

(58) Field of Classification Search
CPC . A01B 49/00–06; A01B 13/02; A01B 13/025; A01G 13/0287; A01G 13/0268
See application file for complete search history.

(56) References Cited

U.S. PATENT DOCUMENTS 2,740,233 A * 4/1956 Reynolds ........... A01G 13/0287
47/9
2,890,665 A * 6/1959 Kang ................. A01G 13/0287
111/102

(Continued)

FOREIGN PATENT DOCUMENTS

| JP | 57-037950 Y2 | 8/1982 |
| JP | 5-016888 Y2 | 5/1993 |

(Continued)

OTHER PUBLICATIONS

International Search Report dated Apr. 17, 2018 issued in corresponding PCT Application PCT/JP2018/000766cites the patent documents above.

*Primary Examiner* — Jessica H Lutz
(74) *Attorney, Agent, or Firm* — Norton Rose Fulbright US LLP

(57) ABSTRACT

A mulching machine comprising a machine body that includes a tilling unit performing tilling, a ridge forming unit forming a ridge with the tilled soil, a mulch film laying unit drawing a mulch film from a film roll and laying it over the ridge, and ground wheels supporting the machine body. The tilling unit and the ridge forming unit are arranged in this order from the front in the traveling direction of the mulching machine, and the film roll is positioned such that its center of gravity does not overlap the ground wheels and is located forward of the ground wheels in the traveling direction.

12 Claims, 8 Drawing Sheets

(51) Int. Cl.
*A01G 13/02* (2006.01)
*A01B 13/02* (2006.01)
*A01B 33/16* (2006.01)

(56) References Cited

U.S. PATENT DOCUMENTS

| | | | |
|---|---|---|---|
| 3,121,973 A | 2/1964 | Phillips et al. | |
| 3,180,290 A * | 4/1965 | Kappelmann | A01C 5/066 111/141 |
| 3,204,589 A * | 9/1965 | Blackhurst | A01C 5/045 111/91 |
| 3,293,797 A * | 12/1966 | Kappelmann | A01G 13/0287 47/9 |
| 3,468,267 A * | 9/1969 | Kinney | A01G 13/0287 111/73 |
| 3,559,599 A * | 2/1971 | Hoadley | A01G 13/0287 111/200 |
| 3,751,821 A * | 8/1973 | Olmo | A01G 13/0287 34/93 |
| 4,117,787 A * | 10/1978 | Pavan | A01C 5/066 111/102 |
| 4,285,161 A * | 8/1981 | Kawasaki | A01G 13/0287 111/102 |
| 4,377,979 A * | 3/1983 | Peterson | A01B 49/06 111/52 |
| 4,513,530 A * | 4/1985 | Nyboer | A01G 13/0287 47/9 |
| 4,886,002 A * | 12/1989 | Scudellaro | A01C 5/045 111/102 |
| 4,953,482 A * | 9/1990 | Emily | A01G 13/0287 111/144 |
| 5,226,376 A * | 7/1993 | Shaw | A01G 13/0287 111/144 |
| 5,906,167 A * | 5/1999 | Miyachi | A01C 7/048 111/200 |
| 10,433,494 B1 * | 10/2019 | Woerner | B09C 1/06 |
| 10,512,222 B1 * | 12/2019 | Woerner | A01G 11/00 |
| 2005/0198895 A1 * | 9/2005 | Rose | A01G 13/0287 47/9 |
| 2011/0209885 A1 * | 9/2011 | Rocca | A01G 13/0287 171/138 |
| 2019/0166753 A1 * | 6/2019 | Hoffman | A01B 79/005 |
| 2019/0364747 A1 * | 12/2019 | Freeman | A01B 35/16 |
| 2020/0236873 A1 * | 7/2020 | Albrecht | A01B 5/04 |
| 2020/0390019 A1 * | 12/2020 | Wu | A01C 19/00 |

FOREIGN PATENT DOCUMENTS

| | | |
|---|---|---|
| JP | 2004-065024 A | 3/2004 |
| JP | 3642902 B2 | 4/2005 |
| JP | 3727618 B | 12/2005 |
| JP | 2009-106189 A | 5/2009 |
| JP | 2009-225706 A | 10/2009 |
| JP | 2009-291125 A | 12/2009 |

\* cited by examiner

MULCHING MACHINE

CROSS REFERENCES TO RELATED APPLICATIONS

This application is a national stage application pursuant to 35 U.S.C. § 371 of International Application No. PCT/JP2018/000766, filed on Jan. 15, 2018 which claims priority under 35 U.S.C. § 119 to Japanese Patent Application No. 2017-005369 filed on Jan. 16, 2017, the disclosures of which are hereby incorporated by reference in their entireties.

TECHNICAL FIELD

The present invention relates to a mulching machine for forming a ridge as a machine body of the mulching machine travels and for laying a mulch film over the ridge.

BACKGROUND ART

A mulching machine as those described above includes, e.g., a tilling unit for performing tilling, a ridge forming unit for forming a ridge with use of the tilled soil, and a mulch film laying unit for drawing a mulch film from a film roll and laying the mulch film over the ridge (e.g., see Patent Literatures 1 and 2 (hereinafter, referred to as PTLs 1 and 2)). For example, the mulching machine is attached to a rear portion of a tractor or the like in such a manner that the mulching machine can be lifted and lowered. When the tractor travels and accordingly the machine body travels, the mulching machine performs the work of forming a ridge and laying the mulch film over the ridge.

PTL 1 discloses positional arrangement of the units in the mulching machine as follows. That is, the tilling unit and the ridge forming unit are arranged in this order from the front side in a traveling direction of the machine body. In addition, ground wheels for supporting the machine body of the mulching machine are arranged laterally to the ridge forming unit. When viewed in the traveling direction of the machine body, the positions of the ground wheels coincide with the center of the ridge forming unit. Furthermore, a film roll is positioned at a location overlapping the rear halves of the ground wheels and being above the rear half of the ridge forming unit in the traveling direction of the machine body.

PTL 2 discloses positional arrangement of the units in the mulching machine as follows. That is, the tilling unit and the ridge forming unit are arranged in this order from the front side in a traveling direction of the machine body. Ground wheels for supporting the machine body of the mulching machine are arranged laterally to the ridge forming unit. When viewed in the traveling direction of the machine body, the positions of the ground wheels coincide with the rear end of the ridge forming unit. A film roll is positioned at a location overlapping the front halves of the ground wheels and being above the rear half of the ridge forming unit in the traveling direction of the machine body.

CITATION LIST

Patent Literature

PTL 1: Japanese Patent Application Laid-Open No. 2009-225706
PTL 2: Japanese Patent No. 3727618

SUMMARY OF INVENTION

Technical Problem

In order to deal with a mulch film laying target area whose area has been increased due to, e.g., an increase in the area of the field, the work with the mulching machine may be performed with an increased number of turns of the mulch film around the film roll. However, this increases the weight of the film roll. Thus, in addition to increasing the number of turns of the mulch film, considering a weight balance in the traveling direction of the machine body is also necessary.

The mulching machine as those described above includes a power transmission unit and/or the like for rotating a tilling shaft of the tilling unit. The power transmission unit and/or the like is a heavy article, and therefore the center of gravity of the mulching machine is located at or near the tilling unit in the traveling direction of the machine body. Thus, if the film roll with an increased weight is located away from the tilling unit, the weight balance in the traveling direction of the machine body may be disrupted, which may lead to a disadvantageous situation in which the mulching machine cannot be lifted or lowered, for example.

In addition, considering the fact that the mulching machine is supported by the ground wheels located rearward of the tilling unit, the positional relation between the film roll and the ground wheels is also important for the purpose of keeping the weight balance in the traveling direction of the machine body. For example, if a greater load is applied to a portion of the mulching machine which portion is rearward of the ground wheels, this may lead to a problem such as unstable posture of the mulching machine. Meanwhile, if an excessive load is applied to the ground wheels, this may cause excessive sinking of the ground wheels and/or a problem with durability of the ground wheels.

In the mulching machine described in PTL 1, the film roll is positioned at a location overlapping the rear halves of the ground wheels and being above the rear half of the ridge forming unit in the traveling direction of the machine body. Namely, the film roll is located away from the tilling unit. This may potentially disrupt the weight balance in the traveling direction of the machine body. Furthermore, since the film roll is positioned at a location overlapping the rear halves of the ground wheels in the traveling direction of the machine body, the load applied to the ground wheels or a portion rearward of the ground wheels tends to be great. Accordingly, a problem involving this may potentially occur.

In the mulching machine described in PTL 2, the film roll is positioned at a location overlapping the front halves of the ground wheels and being above the rear half of the ridge forming unit in the traveling direction of the machine body. Namely, the film roll is located away from the tilling unit. This may potentially disrupt the weight balance in the traveling direction of the machine body. Furthermore, since the film roll is positioned at a location overlapping the front halves of the ground wheels in the traveling direction of the machine body, the load applied to the ground wheels tends to be great. Accordingly, a problem involving this may potentially occur.

In view of the actual circumstances described above, a main object of some aspects of the present invention is to provide a mulching machine that can minimize a load applied to ground wheels and a portion rearward of the ground wheels while maintaining a suitable weight balance in a traveling direction of a machine body of the mulching machine even if the weight of a film roll is increased.

Solution to Problem and Advantageous Effects of Invention

According to a first aspect of the present invention, a mulching machine includes
a machine body having
a tilling unit for performing tilling,
a ridge forming unit for forming a ridge with use of the tilled soil,
a mulch film laying unit for drawing a mulch film from a film roll and laying the mulch film over the ridge, and
ground wheels capable of supporting the machine body, wherein
the tilling unit and the ridge forming unit are arranged in this order from a front side in a traveling direction of the machine body,
the ground wheels are positioned rearward of the tilling unit in the traveling direction of the machine body,
the film roll is positioned such that the center of gravity of the film roll does not overlap the ground wheels and is located forward of the ground wheels in the traveling direction of the machine body,
the machine body is separable into a front unit including the tilling unit and a rear unit including the ground wheels and the ridge forming unit, and
the film roll is included in the front unit and is supported by the front unit.

With the configuration described above, the center of gravity of the film roll does not overlap the ground wheels and is located forward of the ground wheels in the traveling direction of the machine body, the ground wheels being located rearward of the tilling unit in the traveling direction of the machine body. Thus, the center of gravity of the film roll can be located closer to the tilling unit in the traveling direction of the machine body. Consequently, even if the weight of the film roll is increased, it is possible to maintain a suitable weight balance in the traveling direction of the machine body.

Furthermore, since the center of gravity of the film roll does not overlap the ground wheels and is located forward of the ground wheels in the traveling direction of the machine body, the weight of the film roll is naturally applied to a portion of the mulching machine which portion is forward of the ground wheels. Thus, even if the weight of the film roll is increased, the load applied to the ground wheels or the portion rearward of the ground wheels hardly becomes greater. Consequently, the machine body can be supported by the ground wheels in a suitable manner.

With the configuration described above, the machine body can be separated into the front unit and the rear unit. This allows a selection between a state where all the functions of the mulching machine are exerted or a state where only the functions of the tilling unit, which is a part of the mulching machine, are exerted, as needed. Thus, the mulching machine can be used differently depending on the type of the work to be performed. Consequently, the mulching machine is provided as a user-friendly work machine. In addition, the film roll is included in the front unit and is supported by the front unit, the front unit including the tilling unit. Therefore, the center of gravity of the film roll can be suitably located closer to the tilling unit. Thus, even if the weight of the film roll is increased, a suitable weight balance in the traveling direction of the machine body can be maintained.

According to a second aspect of the present invention, the film roll is positioned such that the center of gravity of the film roll is located forward of the ridge forming unit in the traveling direction of the machine body.

With the configuration described above, the center of gravity of the film roll is located forward of the ridge forming unit in the traveling direction of the machine body, the ridge forming unit being located rearward of the tilling unit in the traveling direction of the machine body. Thus, the center of gravity of the film roll can be located closer to the tilling unit when viewed in the traveling direction of the machine body. Consequently, even if the weight of the film roll is increased, it is possible to maintain a suitable weight balance in the traveling direction of the machine body. Furthermore, with the configuration described above, the weight of the film roll is hardly applied to the ridge forming unit. This can prevent a disadvantageous situation in which the ridge forming unit sinks too much and cannot form a suitable ridge of a desired height, for example.

According to a third aspect of the present invention, the center of gravity of the film roll is located between the tilling unit and the ridge forming unit in the traveling direction of the machine body, and the film roll is located upward of the tilling unit and the ridge forming unit.

With the configuration described above, the center of gravity of the film roll can be located between the tilling unit and the ridge forming unit in the traveling direction of the machine body, and, at the same time, the film roll can be disposed in a space above the tilling unit and the ridge forming unit by utilizing this space effectively. Consequently, the center of gravity of the film roll can be located closer to the tilling unit, and the film roll is arranged effectively while interference between the film roll and other members is avoided.

According to a fourth aspect of the present invention,
the mulch film laying unit is configured to lay the mulch film over the ridge while drawing a watering tube from a tube roll and laying the watering tube on an upper side of the ridge,
the tube roll is positioned at a location overlapping the tilling unit in the traveling direction of the machine body and being away from and upward of the tilling unit, and
the film roll is positioned to enter a space under the tube roll.

With the configuration described above, since the mulch film laying unit lays the mulch film over the ridge while laying the watering tube on the upper side of the ridge. Thus, not only the mulch film but also the watering tube can be laid on the ridge having been formed. In addition, since the tube roll is positioned at a location overlapping the tilling unit in the traveling direction of the machine body and being away from and upward of the tilling unit, the film roll can be suitably arranged in a space above the tilling unit by making use of this space. Furthermore, since the film roll is positioned to enter the space under the tube roll, the film roll can be suitably disposed in the space below the tube roll by making use of this space. Consequently, even in a case where both of the tube roll and the film roll are provided, the tube roll and the film roll can be arranged efficiently in a settled manner while the centers of gravity of the tube roll and the film roll are located closer to the tilling unit.

According to a fifth aspect of the present invention, the mulching machine further includes:
right and left paired first support frames extending from a portion above the tilling unit to a portion above the ridge forming unit along a front-rear direction; and right and left paired second support frames extending upward from the right and left paired first support frames, respectively, wherein the film roll is supported by the right and left paired second support frames with the film roll laid between the right and left paired second support frames.

With the configuration described above, the film roll can be firmly supported in a stable posture by the right and left paired first support frames and the right and left paired second support frames. Consequently, it is possible to appropriately draw the mulch film from the film roll, which makes it possible to appropriately perform the work of laying the mulch film.

According to a sixth aspect of the present invention, the mulching machine further includes a braking unit configured to come in contact with an outer periphery of the film roll to give braking power to the film roll.

With the configuration described above, the braking unit comes in contact with the outer periphery of the film roll to give the film roll braking power. Thus, the braking power can be given to the film roll appropriately. Consequently, an unfavorable phenomenon, such as loosening of the mulch film, hardly occurs while the mulch film is being drawn from the film roll. Thus, it is possible to appropriately draw the mulch film from the film roll.

According to a seventh aspect of the present invention, the braking unit includes
a roller that is rotatable while being in contact with the outer periphery of the film roll and
braking power giving members configured to come in contact with side surfaces of the roller, respectively, to give braking power to the roller, and
the roller has an elastic member that is a contact portion configured to come in contact with the outer periphery of the film roll.

With the configuration described above, the braking power giving members come in contact with the side surfaces of the roller to give the braking power to the roller. Thus, the braking power is given to the film roll appropriately. In addition, since the contact portion, which comes in contact with the outer periphery of the film roll, of the roller is the elastic member. Thus, it is possible to give the braking power to the film roll without damaging the film roll.

DESCRIPTION OF EMBODIMENTS

With reference to the drawings, the following will describe embodiments of a mulching machine according to the present invention.

Figure 1:
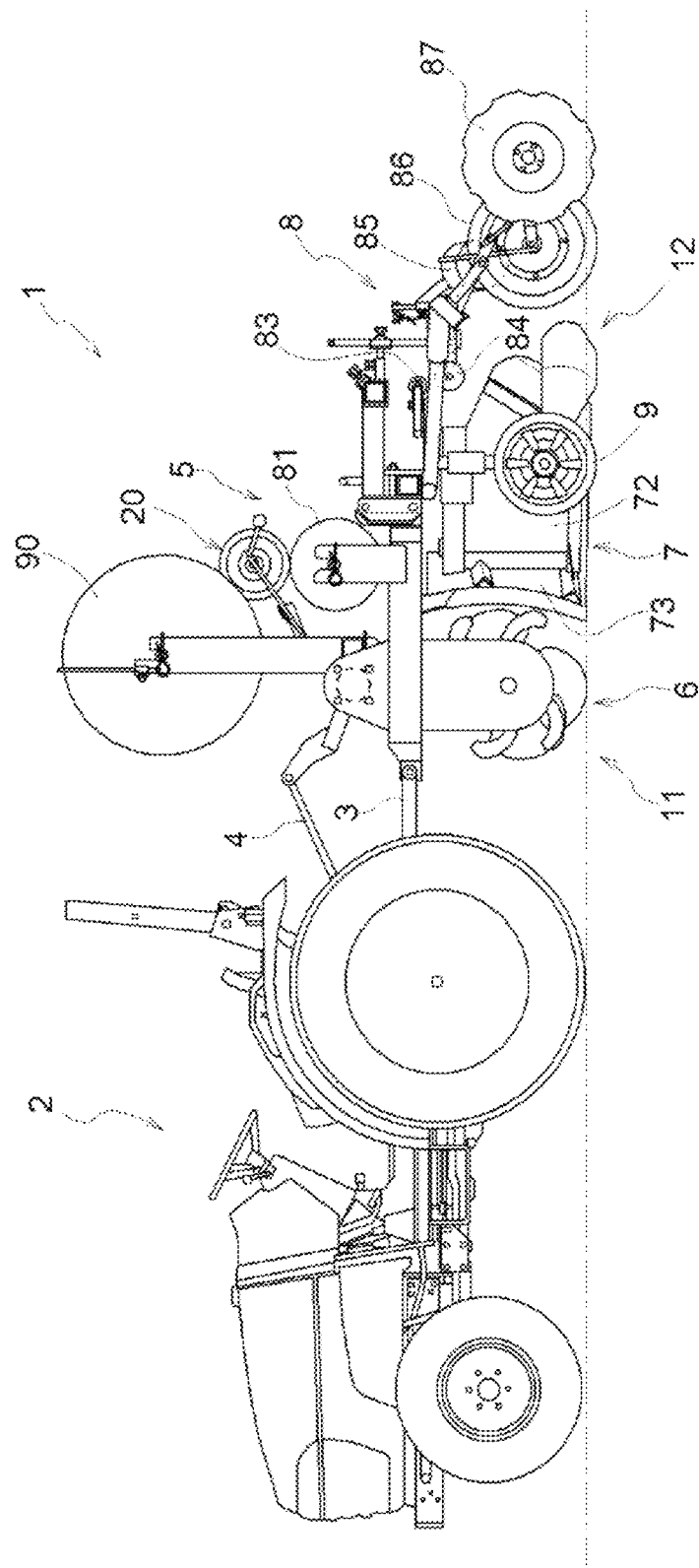
FIG. 1 A side view of a mulching machine attached to a rear portion of a tractor.

As illustrated in FIG. 1, a mulching machine 1 is configured to be attachable to a rear portion of a tractor 2. The rear portion of the tractor 2 has a three-link mechanism including right and left paired lower links 3 and an upper link 4. The mulching machine 1 is configured to be attachable to the three-link mechanism. The rear portion of the tractor 2 has a lifting device (not illustrated) including a hydraulic device such as a lifting cylinder. As a result of lifting or lowering of the three-link mechanism, the mulching machine 1 is lifted or lowered.

Figure 2:
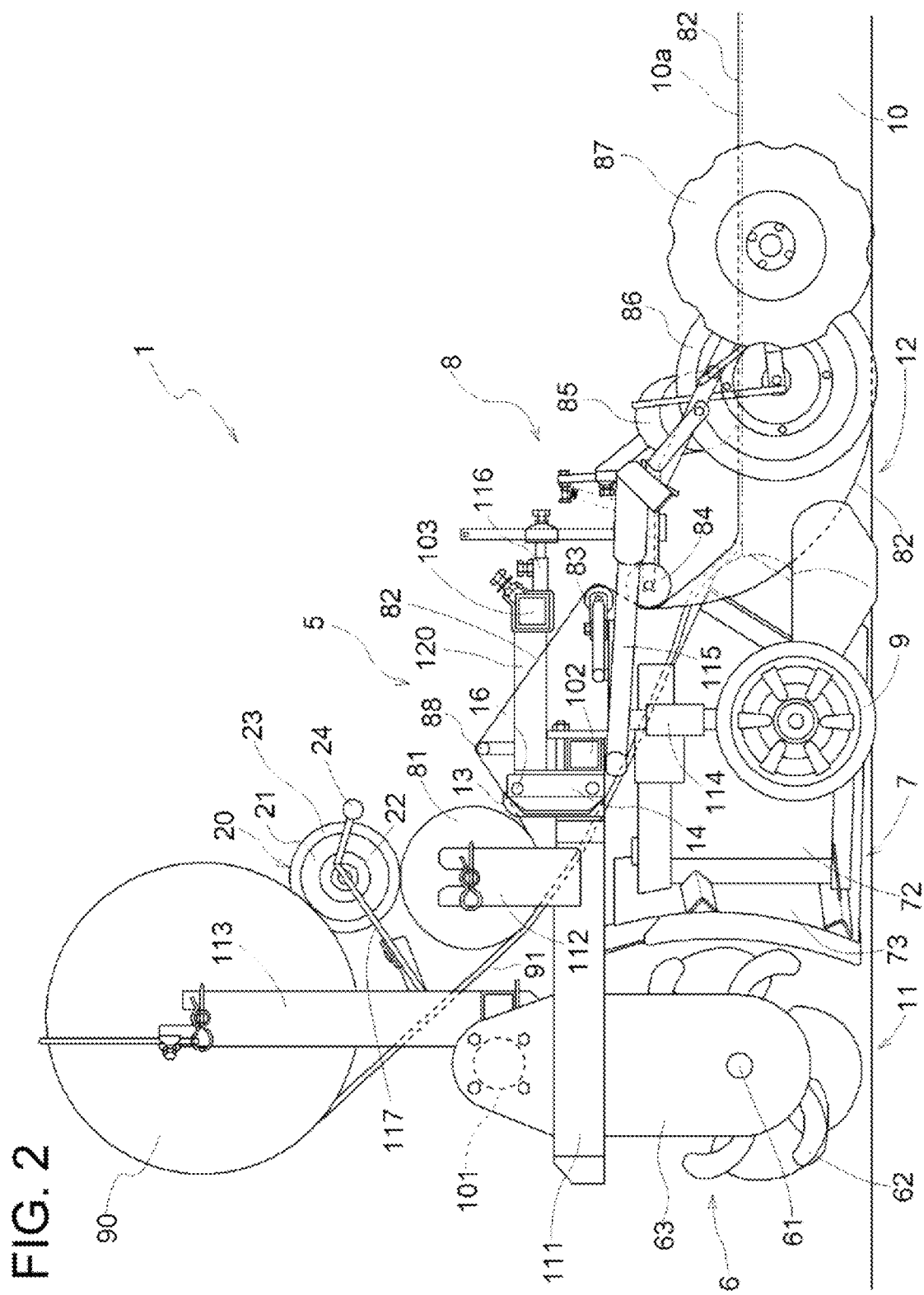
FIG. 2 A side view of the mulching machine.

As illustrated in FIGS. 1 and 2, the mulching machine 1 has a machine body 5 including a tilling unit 6 for performing tilling, a ridge forming unit 7 for forming, with use of the tilled soil, a ridge 10 having a trapezoid cross section, a mulch film laying unit 8 for drawing a mulch film 82 from a film roll 81 and laying the mulch film 82 over the ridge 10, and ground wheels 9 that can support the machine body 5.

As illustrated in FIG. 2, the tilling unit 6 includes a tilling shaft 61 configured to be rotated by rotational drive power transmitted from a power take-off (PTO) shaft (not illustrated) provided in the rear portion of the tractor 2 (see FIG. 1) and a plurality of tilling claws 62 configured to perform tilling along with the rotation of the tilling shaft 61. The tilling shaft 61 and the tilling claws 62 are disposed across the full length of the machine body 5 of the mulching machine 1 in a width direction of the machine body 5 (i.e., in a width direction of the tractor 2). A power transmission unit and/or the like (not illustrated) for transmitting the rotational drive power from the PTO shaft to the tilling shaft 61 is accommodated in a transmission case 63. Although not illustrated in FIG. 2, the tilling unit 6 includes a cover 74 (see FIG. 6) that covers the upper and rear sides of the tilling claws 62.

Figure 3:
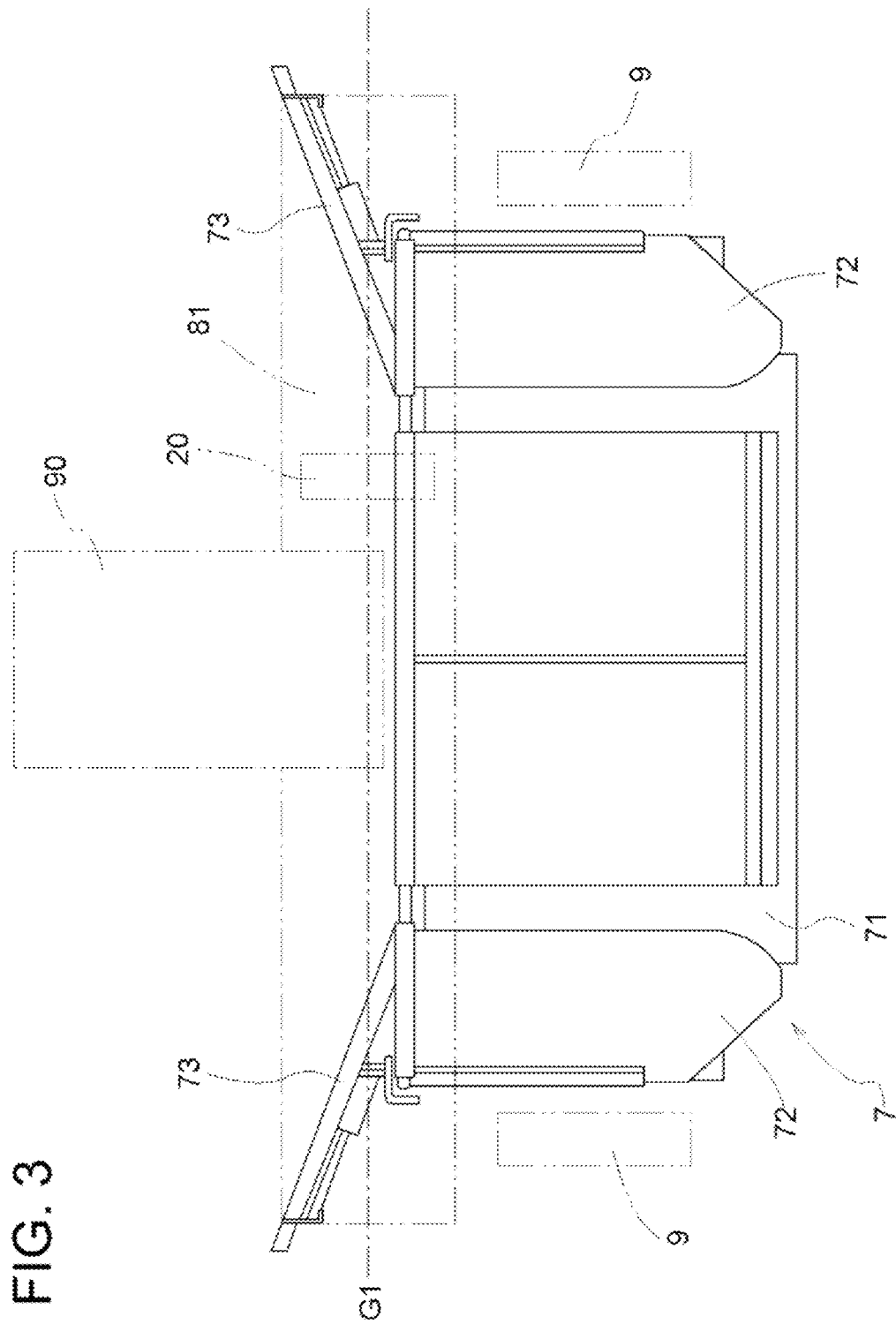
FIG. 3 A plan view schematically illustrating main parts of the mulching machine.
Figure 7:
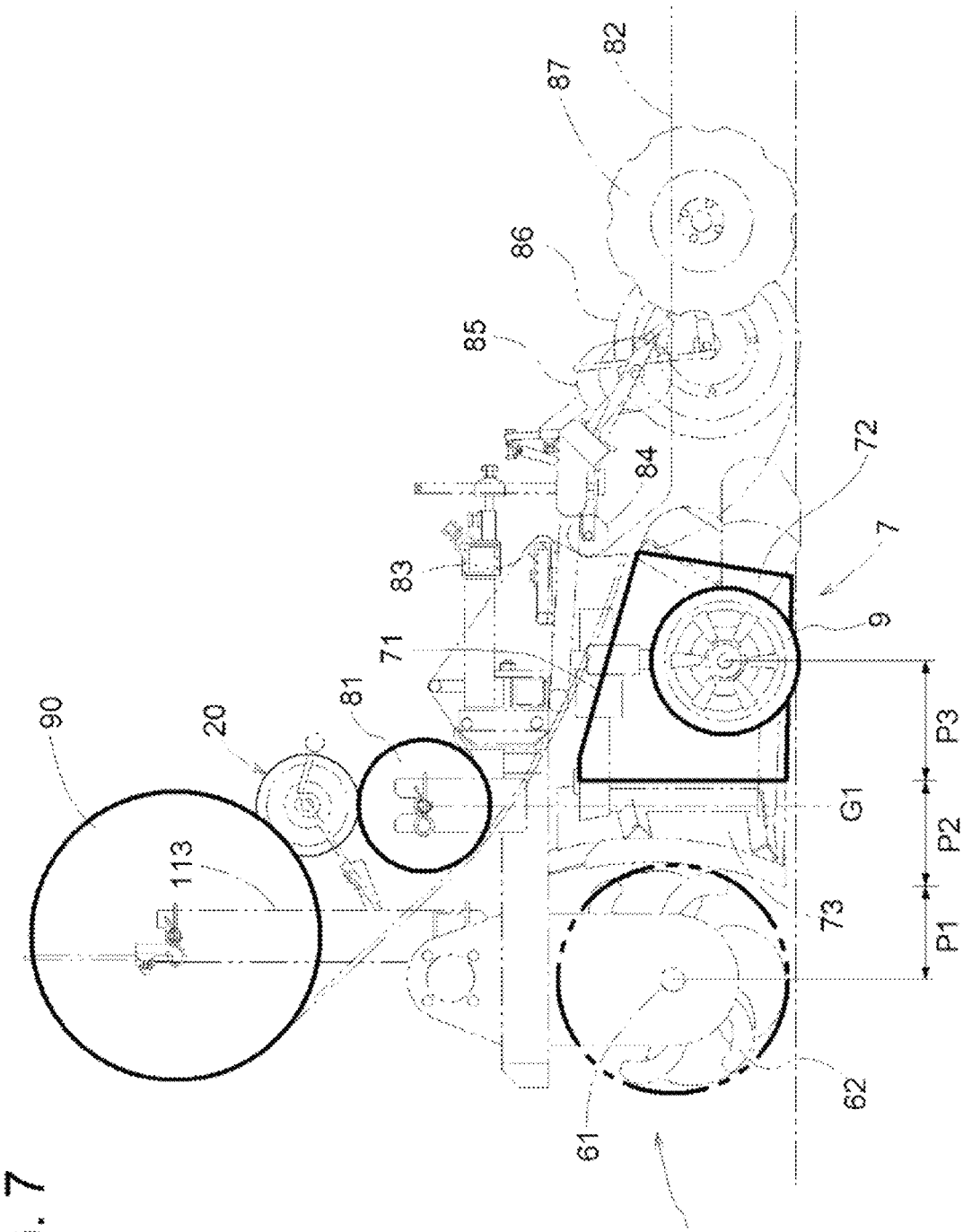
FIG. 7 A view for explaining positional arrangement of the main parts of the mulching machine, viewed from a side.

The ridge forming unit 7 is provided in a laterally center portion (i.e., a center portion in the width direction) of the machine body 5 of the mulching machine 1. As illustrated in FIGS. 3 and 7, the ridge forming unit 7 includes an upper-side forming plate 71 for forming the upper side of a ridge and right and left paired lateral-side forming plates 72 for forming the lateral sides of the ridge. FIG. 3 is a plan view schematically illustrating positional arrangement of the elements in the mulching machine 1, such as the ridge forming unit 7, the ground wheels 9, the film roll 81, and a tube roll 90.

The upper-side forming plate 71 is shaped in a plate extending in a traveling direction of the machine body 5 and being inclined downward as it gets closer to the rear side of the machine body 5 in the traveling direction of the machine body 5 (i.e., as it gets closer to the lower side in FIG. 3 and the right side in FIG. 7). Each of the lateral-side forming plates 72 is shaped in a plate extending in a top-bottom direction and being inclined laterally outward of the machine body 5 (i.e., outward in the width direction of the machine body 5; rightward or leftward in FIG. 3) as it gets closer to the bottom.

The ridge forming unit 7 includes, in its front portion, soil moving plates 73 for moving, toward the ridge forming unit 7, the soil tilled by the tilling unit 6. Each of the soil moving plates 73 is shaped in a plate extending from the front end of a respective one of the right and left paired lateral-side forming plates 72 toward the front side in the traveling direction of the machine body 5. In a plan view, each of the soil moving plates 73 is inclined outward as it gets closer to the front side in the traveling direction of the machine body 5.

Referring back to FIG. 2, the mulch film laying unit 8 includes the film roll 81 around which the mulch film 82 is wound, a first intermediate guide roller 83 and a second intermediate guide roller 84 for guiding the mulch film 82 drawn from the film roll 81, a laying roller 85 for laying a laterally center portion of the mulch film 82 (i.e., a center portion of the mulch film 82 in the width direction of the mulch film 82) on the upper side 10a of the ridge 10, right and left paired trampling wheels 86 for trampling the laterally opposite ends of the mulch film 82 (i.e., the ends of the mulch film 82 in the width direction of the mulch film 82) to lay the mulch film 82 on the laterally opposite sides of the ridge 10, and right and left paired soil covering wheels 87 for covering, with the soil, the laterally opposite ends of the mulch film 82 having been laid by the trampling wheels 86.

The first intermediate guide roller 83 and the second intermediate guide roller 84 are disposed across the full length of the mulch film 82 in a width direction of the mulch film 82. In addition, the first intermediate guide roller 83 and the second intermediate guide roller 84 are configured to guide, toward the upper side 10a of the ridge 10 formed by the ridge forming unit 7, the mulch film 82 drawn from the film roll 81. Between the film roll 81 and the first intermediate guide roller 83, a lifting support 88 is provided. The lifting support 88 is configured to lift upward the mulch film 82 drawn from the film roll 81 and to support the mulch film 82 at that position. The mulch film 82 is arranged such that the mulch film 82 is guided by the lifting support 88, the first intermediate guide roller 83, and the second intermediate guide roller 84 with a tension applied to the mulch film 82.

Figure 4:
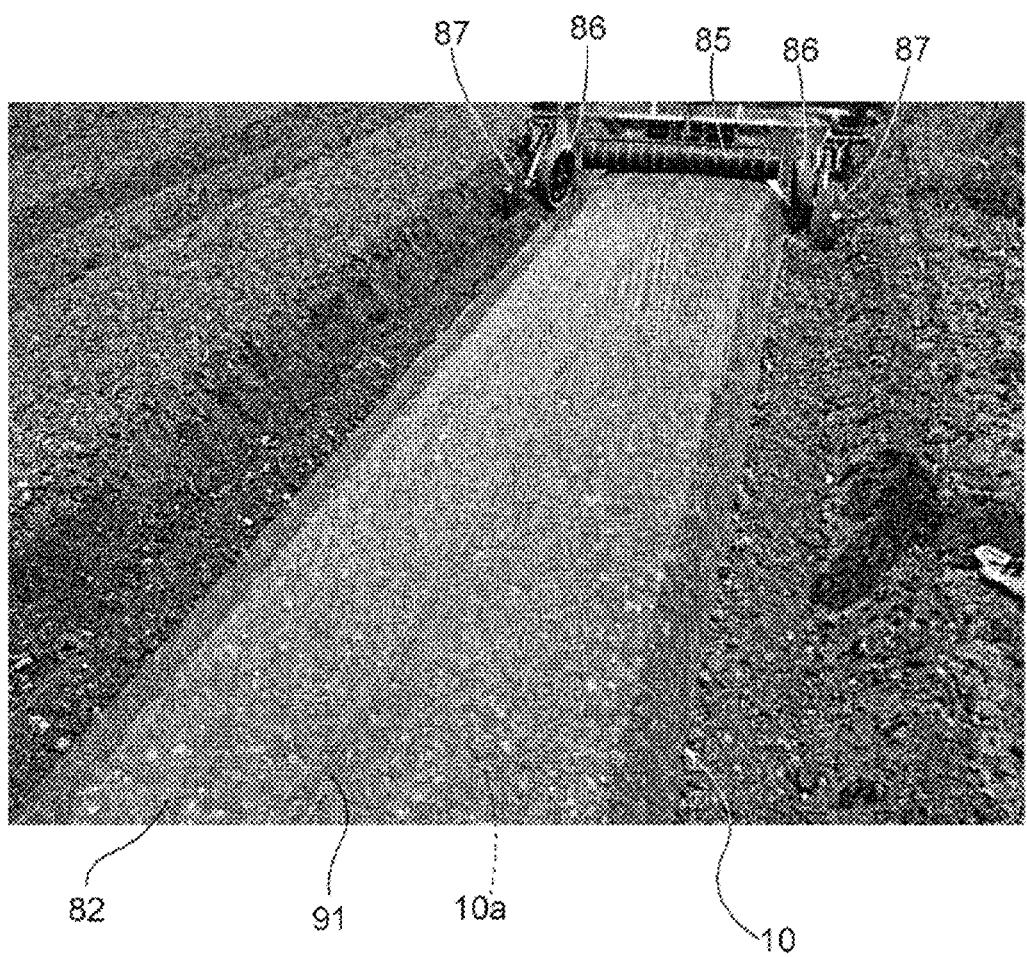
FIG. 4 A view illustrating a state where the mulching machine was performing work.

As illustrated in FIG. 4, the laying roller 85 is disposed across the full length of the upper side 10a of the ridge 10 in the width direction of the upper side 10a, and is configured to press the mulch film 82 downward so that the mulch film 82 is laid on the upper side 10a of the ridge 10. FIG. 4 shows an image of the mulching machine 1 taken from an obliquely rear side while the mulching machine 1 was performing the work of laying the mulch film 82 and a watering tube 91.

The trampling wheels 86 trample on the mulch film 82 to draw the mulch film 82 from the film roll 81. In addition, as a result of the trampling, the mulch film 82 is laid on the laterally opposite sides of the ridge 10. The soil covering wheels 87 are positioned at locations overlapping the trampling wheels 86 in the traveling direction of the machine body 5. As the machine body 5 travels, the soil covering wheels 87 cover, with the soil, the laterally opposite ends of the mulch film 82 laid on the laterally opposite sides of the ridge 10. Thanks to this, the ridge 10 is kept covered with the mulch film 82.

As illustrated in FIGS. 2 and 4, the mulch film laying unit 8, which can lay the mulch film 82 over the ridge 10, is also configured to be capable of laying the mulch film 82 over the ridge 10 while drawing the watering tube 91 from the tube roll 90 and laying the watering tube 91 on the upper side 10a of the ridge 10. The mulch film laying unit 8 includes the film roll 81 around which the mulch film 82 is wound and the tube roll 90 around which the watering tube 91 is wound. As the machine body 5 travels, the mulch film laying unit 8 draws the watering tube 91 from the tube roll 90 and guides the watering tube 91 to be placed under the mulch film 82. Then, the laying roller 85 lays the watering tube 91 and the mulch film 82 on the upper side 10a of the ridge 10. Consequently, the mulch film 82 is laid over the ridge 10 with the watering tube 91 laid on the upper side 10a of the ridge 10.

Figure 5:
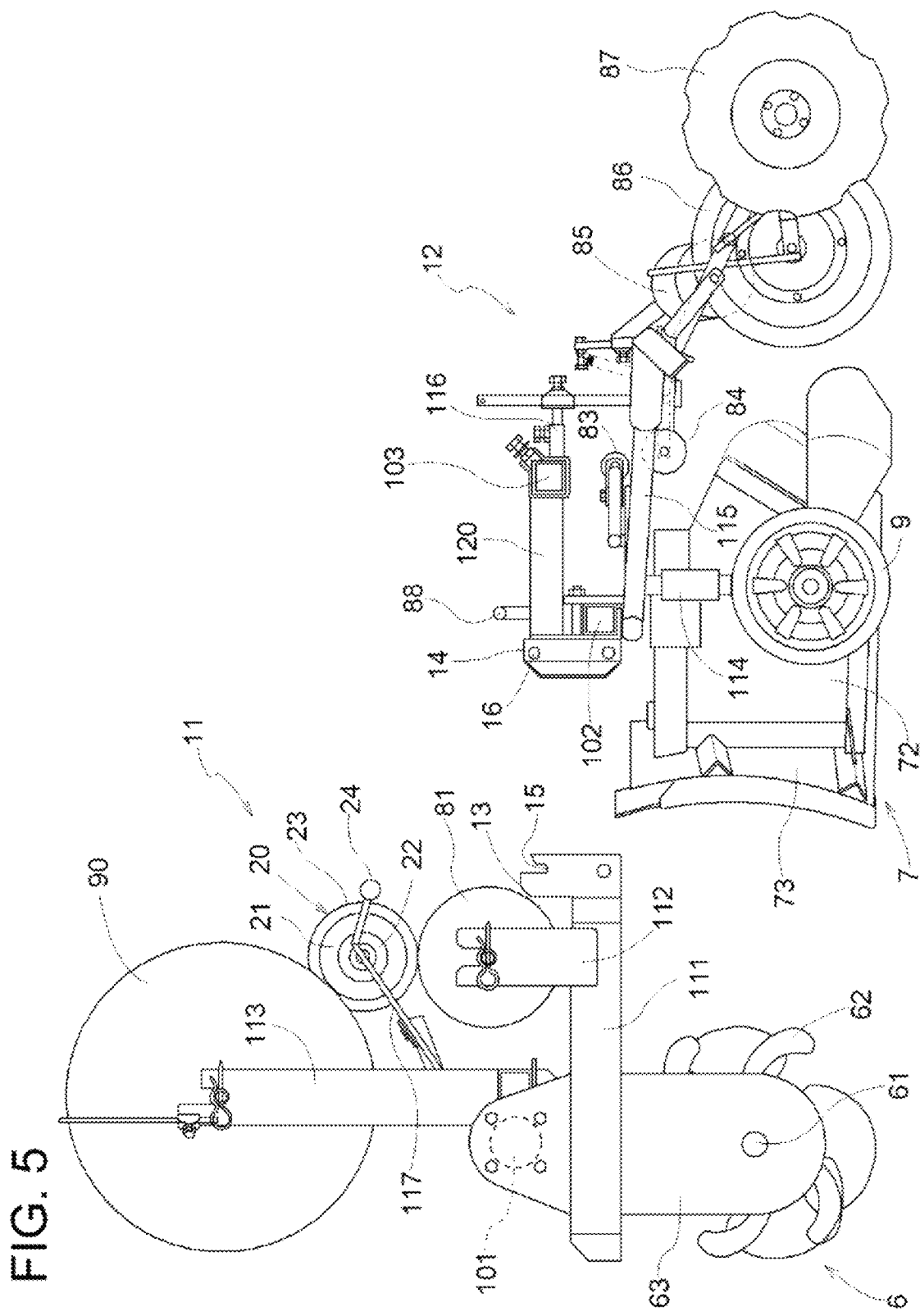
FIG. 5 A side view illustrating the mulching machine separated into a front unit and a rear unit.
Figure 6:
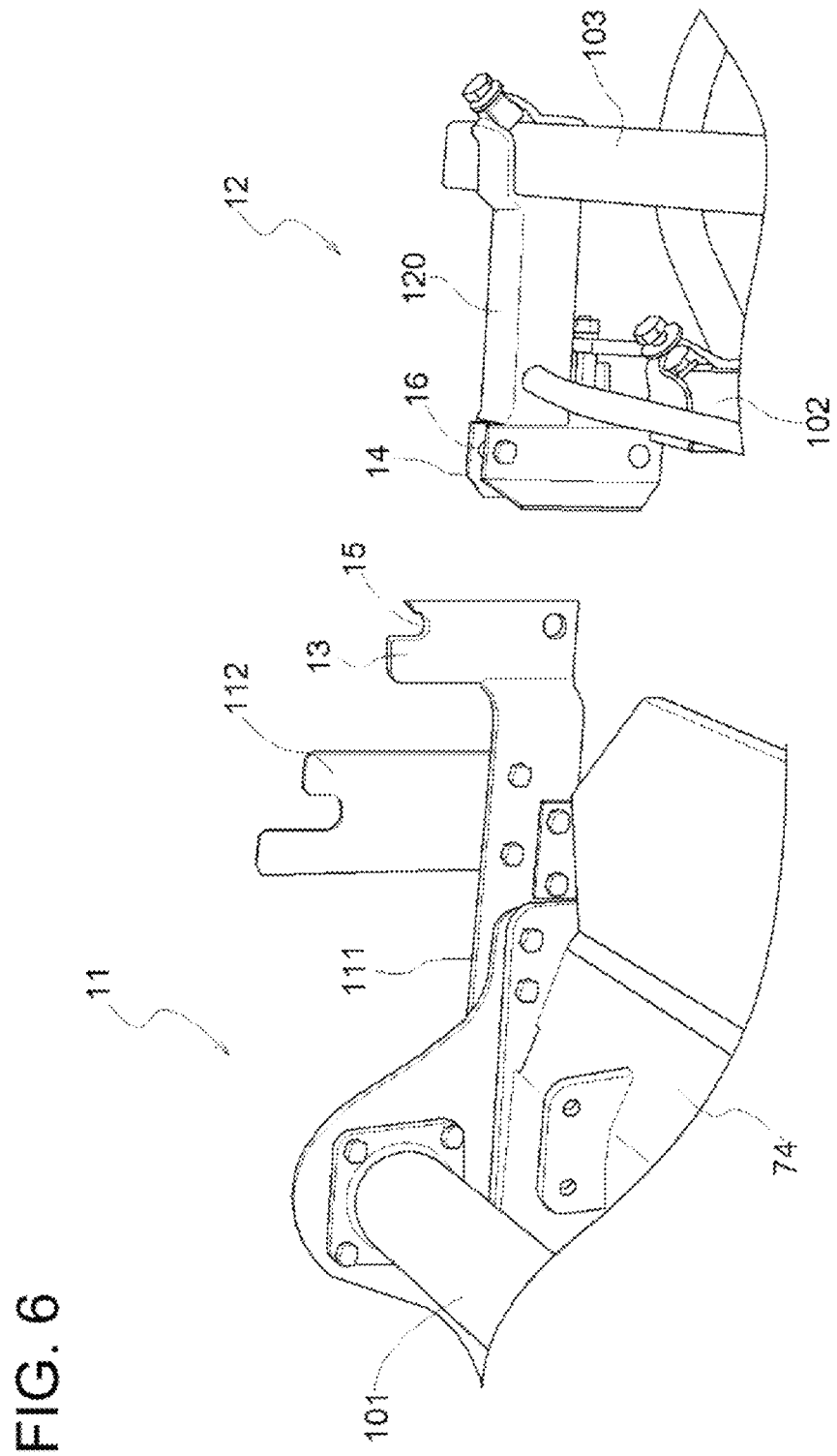
FIG. 6 A view illustrating a portion for coupling the front unit and the rear unit to each other.

As illustrated in FIGS. 5 and 6, the machine body 5 of the mulching machine 1 can be separated into a front unit 11 including the tilling unit 6 and a rear unit 12 including the ground wheels 9 and the ridge forming unit 7. The front unit 11 has a rear end whose laterally opposite ends are respectively provided with front couplers 13, via which the front unit 11 is coupled to the rear unit 12. The rear unit 12 has a front end whose laterally opposite ends are respectively provided with rear couplers 14, via which the rear unit 12 is coupled to the front unit 11. By coupling the front couplers 13 and the rear couplers 14 to each other, the front unit 11 and the rear unit 12 can be integrally coupled together. By releasing the coupling between the front couplers 13 and the rear couplers 14, the front unit 11 and the rear unit 12 can be separated from each other.

Each of the front couplers 13 is shaped in a plate extending in the top-bottom direction and having a recessed slit 15 opened upward. Each of the rear couplers 14 includes two plate-shaped members spaced from each other in the width direction of the machine body 5 and a bar-shaped member 16 laid between the two plate-shaped members. The two plate-shaped members of each of the rear couplers 14 are fitted into a respective one of the front couplers 13 so that the bar-shaped member 16 is engaged with the slit 15. Then, the front coupler 13 and the rear coupler 14 are fixed to each other via a fastener and/or the like (not illustrated). In this manner, the front unit 11 and the rear unit 12 can be coupled to each other.

As illustrated in FIGS. 2 and 5, the front unit 11 includes a first lateral machine frame 101 extending in the width direction of the machine body 5, right and left paired first support frames 111 extending from a portion above the tilling unit 6 to a portion above the ridge forming unit 7 along the traveling direction of the machine body 5 (front-rear direction), right and left paired second support frames 112 extending upward from the right and left paired first support frames 111, respectively, and right and left paired third support frames 113 extending in the top-bottom direction.

The first lateral machine frame 101 is laid across the full length of the tilling unit 6 in the width direction of the machine body 5. The first lateral machine frame 101 supports the tilling unit 6, including the transmission case 63, a cover 74 (see FIG. 6) covering the tilling claws 62, and the like. The first support frames 111 are positioned at locations respectively corresponding to the laterally opposite ends of the machine body 5 (i.e., the opposite ends of the machine body 5 in the width direction of the machine body 5). The first support frames 111 extend rearward from the cover 74 (see FIG. 6) covering the tilling claws 62 and the like. The second support frames 112 extend upward from rear portions of the respective first support frames 111. The film roll 81 is supported by the right and left paired second support frames 112 with the film roll 81 laid between the second support frames 112. The third support frames 113 are located at a laterally center portion of the machine body 5 (i.e., a center portion of the machine body 5 in the width direction of the machine body 5), and extend upward from the cover 74 (see FIG. 6) covering the tilling claws 62 and the like. The tube roll 90 is supported by the right and left paired third support frames 113 with the tube roll 90 laid between the third support frames 113. As described above, in addition to the tilling unit 6, the tube roll 90 and the film roll 81 are included in the front unit 11 in a state where the tube roll 90 and the film roll 81 are supported by the front unit 11.

As illustrated in FIGS. 2 and 5, the rear unit 12 includes a second lateral machine frame 102 extending in the width direction of the machine body 5 and a third lateral machine frame 103 extending in the width direction of the machine body 5. The third lateral machine frame 103 is positioned at a location rearward and upward of the second lateral machine frame 102. The second lateral machine frame 102 and the third lateral machine frame 103 are connected to each other via couplers 120 extending in the traveling direction (front-rear direction) of the machine body 5. The couplers 120 are positioned at locations respectively corresponding to the laterally opposite ends of the machine body 5. The couplers 120 are configured to connect the laterally opposite ends of the second lateral machine frame 102 to the laterally opposite ends of the third lateral machine frame 103, respectively.

As illustrated in FIGS. 2 and 5, the laterally opposite ends of the second lateral machine frame 102 are respectively connected to fourth support frames 114 extending downward. The fourth support frames 114 support the lateral-side forming plates 72 of the ridge forming unit 7 and the ground wheels 9. Although not illustrated, the upper-side forming plate 71 of the ridge forming unit 7 and the first intermediate guide roller 83 are supported by a support frame connected to the second lateral machine frame 102. The laterally opposite ends of the second lateral machine frame 102 are respectively coupled to fifth support frames 115 extending rearward. The fifth support frames 115 support the trampling wheels 86 and the soil covering wheels 87. Each of the fifth support frames 115 is constituted by support frames coupled to each other. In each of the fifth support frames 115, one of the support frames supporting a corresponding one of the trampling wheels 86 and a corresponding one of the soil covering wheels 87 is pivotally linked to another one of the support frames in such a manner that the one of the support frames is movable in a swinging motion. Thus, for example, when the trampling wheels 86 and the soil covering wheels 87 are not in use, the support frames supporting the trampling wheels 86 and the soil covering wheels 87 are moved upward in a swinging motion, so that the trampling wheels 86 and the soil covering wheels 87 can be moved upward to a retracted position upwardly away from the field.

As illustrated in FIGS. 2 and 5, the third lateral machine frame 103 has, in its center, a sixth support frame 116 extending rearward to a midway portion and extending downward therefrom. The sixth support frame 116 supports the second intermediate guide roller 84 and the laying roller 85.

With reference to FIGS. 3 and 7, the following will describe positional arrangement of the tilling unit 6, the tube roll 90, the film roll 81, the ridge forming unit 7, and the ground wheels 9, which are included in the mulching machine 1.

As illustrated in FIG. 7, the tilling unit 6 and the ridge forming unit 7 are arranged in this order from the front side (the left side in FIG. 7) in the traveling direction of the machine body 5. The ground wheels 9 are arranged laterally to the right and left sides of the ridge forming unit 7, as illustrated in FIG. 3. When viewed in the traveling direction of the machine body 5, the ground wheels 9 are positioned rearward of the tilling unit 6, as illustrated in FIG. 7. The film roll 81 is positioned such that, as illustrated in FIGS. 3 and 7, the center of gravity G1 of the film roll 81 does not overlap the ground wheels 9 and is located forward of the ground wheels 9 in the traveling direction of the machine body 5 and forward of the ridge forming unit 7 in the traveling direction of the machine body 5.

In addition, the film roll 81 is arranged such that, as illustrated in FIG. 7, the center of gravity G1 of the film roll 81 is located between the tilling unit 6 and the ridge forming unit 7 in the traveling direction of the machine body 5, and the film roll 81 is located upward of the tilling unit 6 and the ridge forming unit 7. For example, assume that a space between the center of the tilling shaft 61 of the tilling unit 6 and the center of one of the ground wheels 9 is evenly divided into three regions, i.e., a front part P1, an intermediate part P2, and a rear part P3. Then, the film roll 81 is arranged such that the center of gravity G1 of the film roll 81 is positioned in the front part P1 or the intermediate part P2, each of which is located forward of the rear part P3.

The film roll 81 positioned at the above-described location hardly causes an increase in the load applied to a portion of the mulching machine 1 which portion is rearward of the ground wheels 9. Thus, the machine body 5 of the mulching machine 1 can be supported by the ground wheels 9 in a suitable manner. Meanwhile, the power transmission unit and/or the like for transmitting rotational drive power from the PTO shaft is a heavy article, and therefore the center of gravity of the mulching machine 1 is located at or near the tilling unit 6. Thus, by positioning the film roll 81 at the above-described location, the center of gravity of the film roll 81 can be located closer to the tilling unit 6 when viewed in the traveling direction of the machine body 5. Accordingly, even if the weight of the film roll 81 is increased due to an increase in the number of turns of the film roll 81, a suitable weight balance in the traveling direction of the machine body 5 can be maintained.

As illustrated in FIG. 3, the tube roll 90 is positioned at the center in the width direction of the machine body 5. As illustrated in FIG. 7, the tube roll 90 is positioned at a location overlapping the tilling unit 6 in the traveling direction of the machine body 5 and being away from and upward of the tilling unit 6. This creates a space between the tube roll 90 and the tilling unit 6. Thus, the film roll 81 is positioned to enter a space under the tube roll 90.

As described above, even in a case where both of the tube roll 90 and the film roll 81 are provided, both of the tube roll 90 and the film roll 81 can be arranged efficiently in a settled manner while the centers of gravity of the tube roll 90 and the film roll 81 are located closer to the tilling unit 6. Consequently, even if the weight of the tube roll 90 is added as a result of attachment of the tube roll 90 and the weight of the film roll 81 is increased due to an increase in the number of turns of the film roll 81, it is possible to maintain a suitable weight balance in the traveling direction of the machine body 5.

Figure 8:
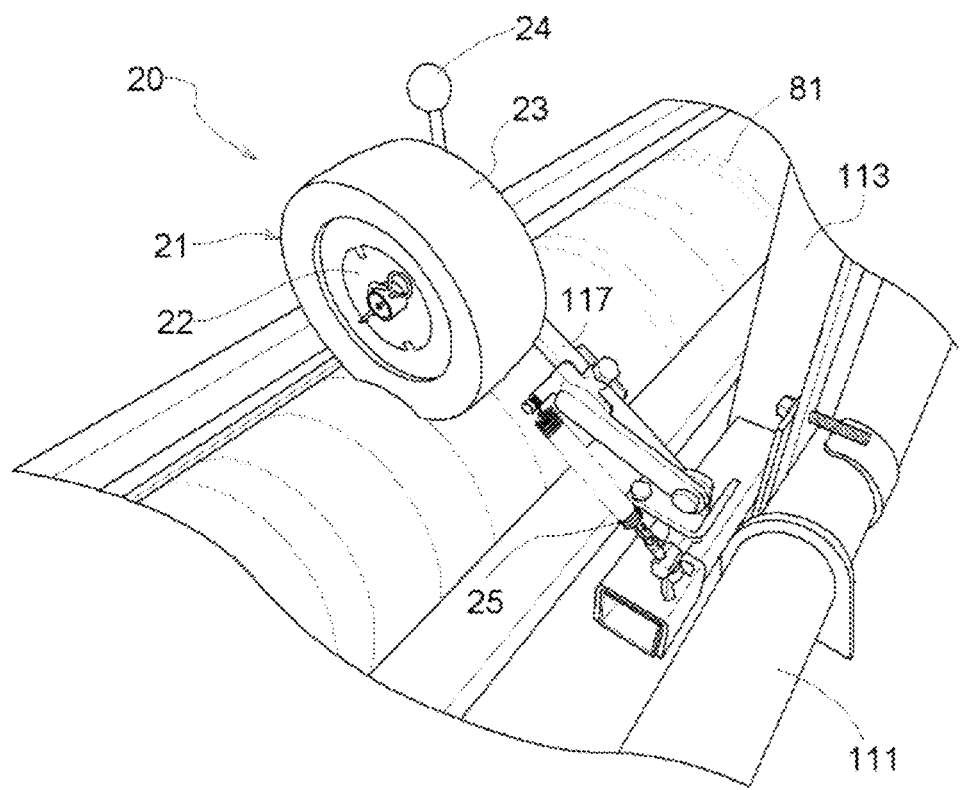
FIG. 8 A perspective view of a braking unit.

As illustrated in FIGS. 2 and 8, the mulching machine 1 includes a braking unit 20 configured to come in contact with the outer periphery of the film roll 81 to give braking power to the film roll 81. FIG. 8 is a perspective view of main parts of the braking unit 20, viewed from the right side of the mulching machine 1. As illustrated in FIG. 3, the braking unit 20 is positioned on the right side of the tube roll 90 in the width direction of the machine body 5. Namely, the braking unit 20 is positioned at a location laterally away from the tube roll 90, which is positioned at the center. As illustrated in FIGS. 2 and 8, the braking unit 20 includes a roller 21 that is rotatable while being in contact with the outer periphery of the film roll 81 and braking power giving members 22 configured to come in contact with the side surfaces of the roller 21, respectively, to give braking power to the roller 21.

As illustrated in FIGS. 2 and 8, the machine body 5 includes a seventh support frame 117 extending obliquely rearward from a position above the tilling unit 6. At the distal end (rear end) of the seventh support frame 117, a roller 21 is supported rotatably. The roller 21 is disposed above the film roll 81 such that the roller 21 comes in contact with an upper portion of the outer periphery of the film roll 81.

As illustrated in FIG. 8, the proximal end (front end) of the seventh support frame 117 is coupled to a portion of the machine body 5 which portion is rearward of the first support frame 111. The proximal end of the seventh support frame 117 is rotatable around an axis being in parallel to the width direction of the machine body 5. In addition, a spring 25 is interposed between the seventh support frame 117 and the coupled portion, so that the spring 25 gives a biasing force for causing the seventh support frame 117 to move downward in a swinging motion. Thus, the biasing force given by the spring 25 acts to press the roller 21 onto the outer periphery of the film roll 81.

The distal end of the seventh support frame 117 is provided with a handle 24 extending therefrom. An operator or the like can hold the handle 24 to cause the seventh support frame 117 to move forward and upward in a swinging motion. This releases the contact between the roller 21 and the outer periphery of the film roll 81, so that the roller 21 can be moved to a position away from the film roll 81.

The braking power giving members 22 are each shaped in a disc configured to come in contact with a corresponding one of the side surfaces of the roller 21. The right and left paired braking power giving members 22 are arranged such that the roller 21 is sandwiched therebetween. Although not illustrated, a compression spring is provided between the braking power giving members 22 and a spring washer. With this configuration, a fastening force is given to the right and left paired braking power giving members 22 so that the right and left paired braking power giving members 22 are pressed onto the side surfaces of the roller 21, respectively.

As illustrated in FIG. 8, the roller 21 has an elastic member 23 that is a contact portion configured to come in contact with the outer periphery of the film roll 81. The elastic member 23 is a sponge or rubber member having a tubular shape and being outwardly fitted to the outer periphery of the roller 21.

Other Embodiments (1) In the embodiment described above, the film roll 81 may be positioned at any location, as long as the film roll 81 is positioned such that the center of gravity G1 of the film roll 81 does not overlap the ground wheels 9 and is located forward of the ground wheels 9 in the traveling direction of the machine body 5, and is located forward of the ridge forming unit 7 in the traveling direction of the machine body 5. Namely, a distance by which the center of gravity G1 of the film roll 81 is forward of the ground wheels 9 can be changed as appropriate. Also, a distance by which the center of gravity G1 of the film roll 81 is forward of the ridge forming unit 7 can be changed as appropriate. For example, the film roll 81 may be positioned such that the center of gravity G1 of the film roll 81 overlaps the tilling unit 6.

(2) In the embodiment described above, the mulch film laying unit 8 is configured to lay not only the mulch film 82 but also the watering tube 91 over the ridge 10. Alternatively, however, the tube roll 90 may be omitted, and the mulch film laying unit 8 may be configured to lay only the mulch film 82 over the ridge 10. With such a configuration, the film roll 81 may be positioned at a location overlapping the tilling unit 6 in the traveling direction of the machine body 5, for example.

(3) In the embodiment described above, the machine body 5 of the mulching machine 1 can be separated into the front unit 11 and the rear unit 12. Alternatively, for example, the machine body 5 of the mulching machine 1 may not be separated into the front unit 11 and the rear unit 12, but may have an integrated configuration.

(4) In the embodiment described above, the mulching machine 1 includes the braking unit 20 configured to come in contact with the outer periphery of the film roll 81 to give braking power to the film roll 81. However, the configuration of the braking unit is not limitative. The braking unit only needs to be capable of giving braking power to the film roll 81.

(5) The embodiment described above has dealt with the example in which the mulching machine 1 is attached to the rear portion of the tractor 2 in such a manner that the mulching machine 1 can be lifted and lowered. Alternatively, the mulching machine 1 may be attached to a rear portion of another type of trailing vehicle. The vehicle towing the mulching machine 1 is not limited to the tractor 2.

INDUSTRIAL APPLICABILITY

The present invention is applicable to a mulching machine for forming a ridge as a machine body of the mulching machine travels and for laying a mulch film over the ridge.

REFERENCE SIGNS LIST 1 mulching machine
5 machine body
6 tilling unit
7 ridge forming unit
8 mulch film laying unit
9 ground wheel
10 ridge
11 front unit
12 rear unit
20 braking unit
21 roller
22 braking power giving member
23 elastic member
81 film roll
82 mulch film
90 tube roll
91 watering tube
G1 center of gravity of film roll

The invention claimed is:
1. A mulching machine comprising:
a machine body including
  a tilling unit for performing tilling of soil,
  a ridge forming unit for forming a ridge with use of the tilled soil,
  a mulch film laying unit for drawing a mulch film from a film roll and laying the mulch film over the ridge, and
  ground wheels for supporting the machine body, wherein
the tilling unit and the ridge forming unit are arranged in this order from a front side in a traveling direction of the machine body,
the ground wheels are positioned rearward of the tilling unit in the traveling direction of the machine body,
the film roll is positioned such that the center of gravity of the film roll is prevented from overlapping the ground wheels and is located forward of the ground wheels in the traveling direction of the machine body, and wherein the film roll is positioned such that the center of gravity of the film roll is located forward of the ridge forming unit in the traveling direction of the machine body.

2. The mulching machine according to claim 1, wherein the center of gravity of the film roll is located between the tilling unit and the ridge forming unit in the traveling direction of the machine body, and the film roll is located upward of the tilling unit and the ridge forming unit.

3. The mulching machine according to claim 1, wherein:
the mulch film laying unit is configured to lay the mulch film over the ridge while drawing a watering tube from a tube roll and laying the watering tube on an upper side of the ridge,
the tube roll is positioned at a location overlapping the tilling unit in the traveling direction of the machine body and being away from and upward of the tilling unit, and
the film roll is positioned to enter a space under the tube roll.

4. The mulching machine according to claim 1, further comprising:
right and left paired first support frames extending from a portion above the tilling unit to a portion above the ridge forming unit along a front-rear direction; and
right and left paired second support frames extending upward from the right and left paired first support frames, respectively, wherein
the film roll is supported by the right and left paired second support frames with the film roll laid between the right and left paired second support frames.

5. The mulching machine according to claim 1, further comprising:
a braking unit configured to come in contact with an outer periphery of the film roll to give braking power to the film roll.

6. The mulching machine according to claim 5, wherein the braking unit includes:
a roller that is rotatable while being in contact with the outer periphery of the film roll, and braking power giving members configured to come in contact with side surfaces of the roller, respectively, to give braking power to the roller; and
the roller has an elastic member that is a contact portion configured to come in contact with the outer periphery of the film roll.

7. A mulching machine comprising:
a machine body including
a tilling unit for performing tilling of soil,
a ridge forming unit for forming a ridge with use of the tilled soil,
a mulch film laying unit for drawing a mulch film from a film roll and laying the mulch film over the ridge, and
ground wheels for supporting the machine body, wherein
the tilling unit and the ridge forming unit are arranged in this order from a front side in a traveling direction of the machine body,
the ground wheels are positioned rearward of the tilling unit in the traveling direction of the machine body,
the machine body is separable into a front unit including the tilling unit and a rear unit including the ground wheels and the ridge forming unit, and
the film roll is included in the front unit and is supported by the front unit.

8. The mulching machine according to claim 7, wherein the center of gravity of the film roll is located between the tilling unit and the ridge forming unit in the traveling direction of the machine body, and the film roll is located upward of the tilling unit and the ridge forming unit.

9. The mulching machine according to claim 7, wherein:
the mulch film laying unit is configured to lay the mulch film over the ridge while drawing a watering tube from a tube roll and laying the watering tube on an upper side of the ridge,
the tube roll is positioned at a location overlapping the tilling unit in the traveling direction of the machine body and being away from and upward of the tilling unit, and
the film roll is positioned to enter a space under the tube roll.

10. The mulching machine according to claim 7, further comprising:
right and left paired first support frames extending from a portion above the tilling unit to a portion above the ridge forming unit along a front-rear direction; and
right and left paired second support frames extending upward from the right and left paired first support frames, respectively, wherein
the film roll is supported by the right and left paired second support frames with the film roll laid between the right and left paired second support frames.

11. The mulching machine according to claim 7, further comprising:
a braking unit configured to come in contact with an outer periphery of the film roll to give braking power to the film roll.

12. The mulching machine according to claim 11, wherein the braking unit includes:
a roller that is rotatable while being in contact with the outer periphery of the film roll, and braking power giving members configured to come in contact with side surfaces of the roller, respectively, to give braking power to the roller; and
the roller has an elastic member that is a contact portion configured to come in contact with the outer periphery of the film roll.

* * * * *